Dec. 1, 1959     K. WROBEL     2,915,268
RING CLAMP
Filed May 15, 1956     2 Sheets-Sheet 1
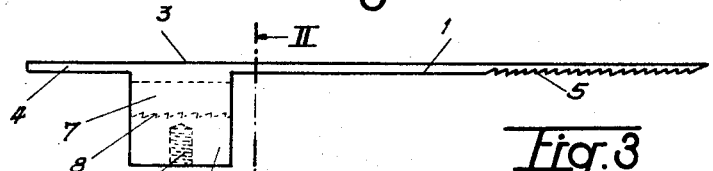
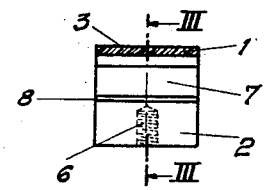
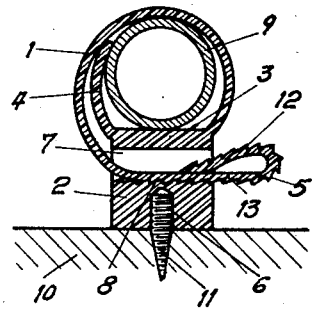
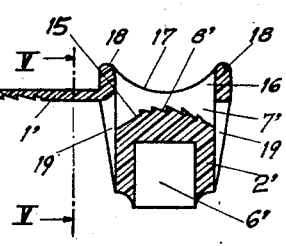
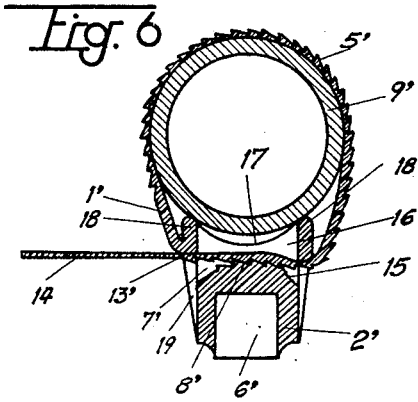
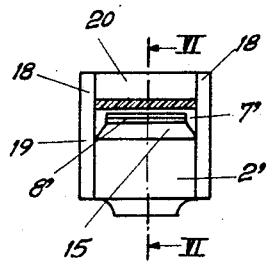
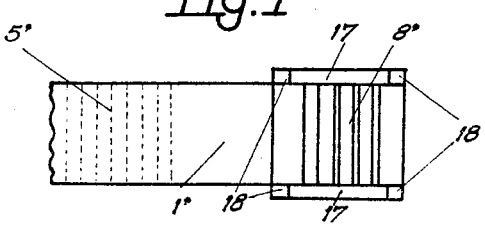
Inventor:
Kurt Wrobel
by: J. Delattre-Seguy
Attorney

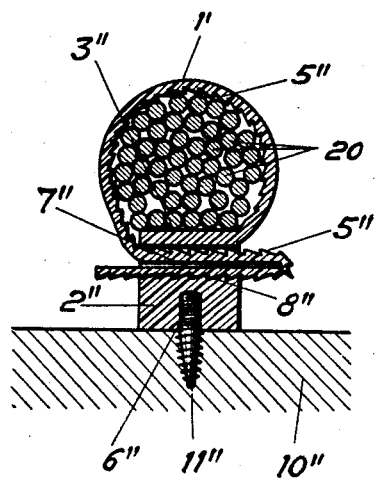

| United States Patent Office | 2,915,268
Patented Dec. 1, 1959 |
|---|---|

2,915,268
RING CLAMP

Kurt Wrobel, Montmorency, France, assignor to Societe Parisienne de Constructions Electromecaniques (S.O.P.A.C.E.M.)

Application May 15, 1956, Serial No. 585,113

Claims priority, application France May 17, 1955

10 Claims. (Cl. 248—74)

This invention relates to clamping devices, and its principal object is the provision of an improved annular clamp particularly suitable for securing in position elongated cylindrical articles such as round rods, pipes, cables, and the like, with respect to a supporting surface or wall. An object of the invention is the provision of such an improved clamp which may be readily molded from plastic materials. Another object is to provide such a clamp which may be used in connection with various sizes of cylindrical articles, and one that may be dismantled and reused repeatedly.

The present invention is in the nature of an improvement or modification of that disclosed in my copending patent application Ser. No. 576,647 filed April 6, 1956, now Patent No. 2,884,214.

In accordance with one aspect of my present invention, I provide a ring clamp comprising a rigid base portion of generally parallelepiped form with means for securing it to a supporting wall surface, a flexible elongated strip portion integral with and projecting from one side of said base portion, a recess formed through said base portion parallel to and spaced a small distance from said strip portion, toothed means formed one said strip portion on the side thereof towards said base portion and complementary toothed means formed in said recess on the side thereof away from said strip portion, whereby said strip portion may be bent over and around an object to be clamped and then inserted into said recess with said toothed means of the strip portion resiliently engaging the toothed means of the recess.

The above and further objects, features and advantages of the invention will appear more fully from the ensuing description of exemplary forms of embodiment thereof, given by way of illustration but not of limitation, and illustrated in the accompanying drawings, wherein:

Fig. 1 is an elevational view of an improved ring clamp prior to its being shaped for use.

Fig. 2 is a section on line II—II of Fig. 1.

Fig. 3 is a section on line III—III of Fig. 2, with the clamp encircling a pipe.

Fig. 4 is a medial vertical view of a modified ring clamp according to the invention, prior to use thereof, with parts broken away.

Fig. 5 is a section on line V—V of Fig. 4.

Fig. 6 is a section on line VI—VI of Fig. 5 with the ring clamp encircling a pipe.

Fig. 7 is a partial plan view corresponding to Fig. 4; and

Fig. 8 is a section similar to that of Fig. 3, showing a modified ring clamp encircling a bundle of wires or cables.

In a first embodiment of the invention as illustrated in Figs. 1 to 3, the ring clamp which is made of a molded plastic material, comprises a flexible portion 1 formed as a relatively long, narrow and thin-gauge strip or band, one end of which is integral with a rigid base portion 2 in the general form of a parallelepiped, having a top bearing surface 3 adapted for engagement with a pipe, cable or other article to be secured in position by the ring clamp. Beyond the base portion 2 there is a strip portion 4 similar to the strip 1 but substantially shorter than it. The free end of strip portion 1 has teeth 5 formed over a substantial length thereof, so as to permit the ring clamp being used in connection with articles of different diameters, a feature that was not present in the construction disclosed in the above mentioned prior patent application, since the toothed portion of the ring clamp disclosed therein was comparatively short in length. The extension portion 4 on the other hand is smooth. The teeth 5 are formed as ratchet teeth and are provided on the same side of strip 1 as that from which the base portion 2 projects. The base portion 2 is formed with a screw-threaded hole 6 adapted to receive a suitable securing element for securing the clamp to a supporting surface such as a wall; said element may be in the nature of a screw, rivet, sealing pin, or the like. The threaded hole 6 extends normally to the bearing surface 3. The base portion 2 is further formed with a rectangular recess 7 with the side thereof remote from the bearing surface 3 being formed with ratchet teeth 8.

In order to secure an article, such as a pipe 9, with the improved ring clamp, a procedure is used which will now be described with reference to Fig. 3. A securing element 11, herein shown as a taper screw, is engaged in the threaded hole 6 to secure the ring clamp to a wall 10. The pipe 9 is then placed over the bearing surface 3 and the strip portion 1 is bent over the extension portion 4, so that said extension portion is applied against the pipe periphery. The toothed end 5 of strip 1 is inserted into the recess 7 and is drawn out a sufficient amount to cause the pipe 9 to be firmly clamped thereby, and the teeth 5 and 8 are allowed to engage with each other through the inherent resiliency of the strip 1. If the projecting length of the strip 1 is found to be long enough, the strip 1 is folded over as illustrated at 12, and reinserted into the recess 7, which is provided wide enough for this purpose. If however the projecting length of strip 1 is relatively short, or again if it is not considered worthwhile to retain the ring clamp in an intact condition for its subsequent re-use in connection with a pipe of larger diameter, then the free end portion may be cut off as at 13, this being readily accomplished since this part of the ring clamp is made of a flexible plastic material.

To remove the ring clamp of Fig. 3, it is simply necessary to exert downward pressure upon the top of the loop 12 so as to disengage it from the recess 7, then exert upward pressure on part 1 near the point 13 to disengage teeth 5 and 8 from each other.

A ring clamp of the type shown in Figs. 1 to 3 just described can be used in connection with articles within a wide range of diameters. It has been provide that a ring clamp of this type can withstand high traction stresses, e.g. in the order of about 50 kg.

A ring clamp in accordance with the invention able to withstand even high strains may be provided using the construction illustrated in Figs. 4 to 6. The general arrangement of parts is similar to that described with reference to Figs. 1 to 3, and the corresponding parts have been designated by the same reference numbers, with addition of a prime symbol. In this construction, the ring clamp again comprises an elongated flexible strip 1' formed with teeth 5' over a major part of its length, beyond which however the strip has a thinned-down portion 14 as illustrated, for a purpose to appear thereafter. The strip 1' is integral with a rigid base portion 2' formed with a bore 6' therein for receiving a securing element, e.g. a screw, not shown. Herein however the base 2' is shaped somewhat differently from the base of the first embodiment, and the flexible extension such as 4 of the first embodiment may be omitted. The base 2' is formed with a recess 7' having a transverse cross section substantially the shape of a U and is adapted to receive therein the end portion of strip 1', and ratchet teeth 8' are provided for cooperation with the teeth 5'. In this embodiment, the bottom side 15 of recess 7' is slightly convex in an upward direction, as clearly shown in Figs. 4 to 6, so that the tips of teeth 8' are somewhat elevated above the lowermost parts of the recess 7'. Moreover, the recess 7' is open on its uppermost side and is defined on either side thereof by flanges 16 (Figs. 4 and 6). The flanges 16 are preferably cut out in the form of a semi-circle as at 17, so as to define four engaging surfaces 18, preferably rounded as shown, for engaging the article to be clamped. Side ribs 19 are preferably provided for reinforcing the base.

In an alternative construction, not illustrated, the cut out 17 may be omitted so that the flanges 16 would then be continuous.

Referring to Fig. 6, the procedure for clamping a pipe 9' with the ring clamp of the type shown in Figs. 4 to 7, is the following. The pipe is placed over the surfaces 18, and the flexible strip 1' is bent to ring form over the pipe 9'. The reduced end portion 14 of the strip is then inserted into recess 7', this being easily accomplished due to the reduced thickness of portion 14. A pull is then exerted on end portion 14 while at the same time curving it downwardly so that the toothed portion 5' will assume a downwardly concave configuration within the recess 7'; this is made possible owing to the fact that the gap between the flanges 16 is equal in extent to the width of the strip 1', and that the free vertical dimension from the tips of teeth 8' to the adjacent surface of the pipe is substantially greater than the thickness of the toothed portion 5' of the flexible strip. When the clamp has been thus made to encircle the pipe tightly enough, the teeth 5' and 8' are allowed to engage with one another, and if desired the end portion of the flexible part may be cut off as at 13' in Fig. 6, substantially flush with the base 2', this being easily effected owing to the thin flexible character of the strip.

Numerous tests have demonstrated that, as a result of the convex shape of the bottom side 15 of recess 7', the improved ring clamp will withstand traction strains much higher than withstood by the clamp of Figs. 1–3, and which can reach about 200 kg., and a ring clamp of given size will be adapted for use with pipes (or other articles) of widely varying diameters.

Such a clamp is not readily disengaged. To disengage it the flexible strip portion must first be lifted up within the recess 7' and the overlying space 20 so as to disengage the teeth 5' and 8' from one another.

The hole 6' receiving the securing element for securing the clamp to a supporting surface such as a wall, may be a screw-tapped hole as in the first described embodiment. Alternatively the aperture may be smooth, and the plastic character of the material from which the ring clamp is formed may be taken advantage of to thread the securing screw thereinto.

The type of ring clamp just described is very easily produced by a molding operation. For this purpose, there may be provided a die member corresponding in shape to the strip 1' with the teeth 5' and the reduced portion 14 and to the exterior of portion 2' and a complementary punch member may be provided for simultaneously forming the recess 7' with the flanges 16 and cut-outs 17, and the teeth 8' with the bottom side 15 of the recess.

In a further modification, illustrated in Fig. 8 in which the corresponding parts have been designated by the same reference numbers with the addition of the symbol, which may be particularly desirable for use in cases where the article to be clamped has a comparatively soft surface, a ring clamp may be used comprising a flexible strip 1" formed with ratchet teeth 5" on the side thereof opposite from that on which the ratchet teeth 5 or 5' were provided in either of the above described embodiments. Said teeth 5" will then engage the article to be clamped (for instance electric cables 20) and will improve the bond therewith. In this construction, a rigid base 2" is preferably used of the kind shown in Fig. 1, and the end of the strip 1" is first inserted into the recess 7" with the teeth 5" directed towards the smooth upper side of the recess 7", whereupon said end portion is folded back and down so that the teeth 5" will engage with the ratchet teeth 8" provided in the bottom of the recess 7" in the base 2". If desired, instead of folding back the strip 1" at the time of use, in the manner stated above, said end portion may be bent during the molding operation, as described with reference to Figs. 1 and 4 of the afore-mentioned prior patent application. In such case however the ring clamp will only be practicably usable in connection with a single diameter of the part to be clamped.

It will be understood that the details of the described embodiments described and illustrated are exemplary only, and that departures may be made therefrom without exceeding the scope of the ensuing claims.

What I claim is:

1. A clamp of the type described, comprising a rigid, thick and substantially parallelepipedic base portion having means for securing it to a supporting surface, a flexible elongated strip portion integral with and projecting from a side of said base portion, a channel-like recess formed in and extending through said base portion between opposite sides thereof, said recess being defined by inner walls in said base portion, one of said inner walls being substantially parallel to the bottom plane of said base portion, said parallel inner wall being that nearest said bottom plane and being substantially parallel to the extended plane of said strip and remote from said extended plane, said recess being closely spaced from said strip portion, first teeth formed on said parallel inner wall, and further and complementary teeth formed on said strip portion whereby said strip portion may be bent over and around an object to be clamped and then inserted into and drawn through said recess with said further teeth resiliently engaging said first teeth to clamp said object firmly in position.

2. A clamp as claimed in claim 1, wherein said base and strip portions are integrally molded from plastic material.

3. A clamp as claimed in claim 1, wherein said means for securing the base portion to a supporting surface comprise a hole formed in said base portion normally to the surface of said strip and below said recess and opening in the bottom side of said base portion remote from said recess and strip.

4. A clamp of the type described, comprising a substantially parallelepipedic, rigid and thick base portion, means for securing said base portion to a supporting surface, a first flexible elongated strip portion integral with and projecting from one side of said base portion, a further flexible elongated flexible strip portion integral with and projecting from the opposite side of said base portion, a channel-like recess formed in and extending through said base portion between opposite sides thereof, said recess being defined by inner walls in said base portion, one of said inner walls being substantially parallel to the bottom plane of said base portion and to the extended plane of said strip portions, said parallel wall being that nearest said bottom plane and remote from said extended plane, said recess being adjacent said strip portions, first teeth formed on said parallel inner wall, and further and complementary teeth formed on the side of said first strip portion directed towards said recess, whereby said first strip portion may be bent over and around an object to be clamped and said second strip portion, and then inserted into and drawn through said recess with said further teeth resiliently engaging said first teeth.

5. A clamp as claimed in claim 4, wherein said further strip portion is substantially shorter than said first strip portion.

6. A clamp of the type described, comprising a rigid and thick base portion having a bottom side and means for securing said bottom side to a supporting surface, a flexible elongated strip portion integral with and projecting from one end of said base portion adjacent a top side thereof, a channel-like recess formed in and extending through said base portion between opposite sides thereof, and in the top side thereof adjacent said strip, said recess being defined by inner walls in said base portion, said inner walls comprising a bottom wall substantially parallel to said bottom side, first teeth formed on the bottom wall of said recess, and further teeth formed on the bottom side of said strip adapted for resilient engagement with said first teeth when said strip is being bent over and around an object to be clamped and is them inserted into said recess.

7. A clamp of the type described, comprising a rigid, thick and substantially parallelepipedic base portion having a bottom portion and means for securing said bottom portion to a supporting surface, a flexible elongated strip portion integral with and projecting from one end of said base portion adjacent a top side thereof, a channel-like recess formed in and extending through said base portion in said top side between opposite sides of said base portion said recess being defined by inner walls in said base portion, said inner walls comprising an upwardly-convex bottom wall, first teeth formed in said bottom wall, and further teeth formed on the bottom side of said strip adapted for resilient engagement with said first teeth when said strip is bent over and around an object to be clamped and then is drawn through said recess.

8. A clamp as claimed in claim 7, wherein said base portion is formed in its top side with two intersecting mutually normal recesses defining bearing surfaces at corners of said top side, said object being adapted to engage said bearing surfaces in the clamped condition thereof.

9. A clamp as claimed in claim 1, wherein said further teeth are formed on that side of said strip which is directed away from the periphery of said object in the bent-over condition of the strip.

10. A clamp as claimed in claim 1, wherein said further teeth are formed on that side of said strip which is directed towards the periphery of said object in the bent-over condition of the strip, and said strip is adapted to be folded back after insertion thereof into said recess for engagement of said further teeth with said first teeth.

References Cited in the file of this patent
UNITED STATES PATENTS

| | | |
|---|---|---|
| 1,441,154 | Johnson | Jan. 2, 1923 |
| 2,359,209 | Ellinwood | Sept. 26, 1944 |
| 2,373,833 | Johnson | Apr. 17, 1945 |
| 2,632,217 | Flora | Mar. 24, 1953 |

UNITED STATES PATENT OFFICE

CERTIFICATE OF CORRECTION

Patent No. 2,915,268                      December 1, 1959

Kurt Wrobel

It is hereby certified that error appears in the above numbered patent requiring correction and that the said Letters Patent should read as corrected below.

In the grant, lines 2 and 3, lines 12 and 13, and in the heading to the printed specification, lines 3 to 5, name of assignee, for "Societe Parisienne de Constructions Electro-mecaniques (S.O.P.A.C.E.M.)" read -- Societe Parisienne de Constructions Electro-Mecaniques (S.O.P.A.C.E.M.) --.

Signed and sealed this 28th day of June 1960.

(SEAL)
Attest:
KARL H. AXLINE

Attesting Officer

ROBERT C. WATSON
Commissioner of Patents